US006908949B2

United States Patent
Arch et al.

(10) Patent No.: US 6,908,949 B2
(45) Date of Patent: Jun. 21, 2005

(54) FOAMABLE INTERPOLYMER RESIN PARTICLES CONTAINING LIMONENE AS A BLOWING AID

(75) Inventors: Paul Edward Arch, Coraopolis, PA (US); Edwin H. Niemann, Beaver, PA (US)

(73) Assignee: Nova Chemicals Inc., Moon Township, PA (US)

( * ) Notice: Subject to any disclaimer, the term of this patent is extended or adjusted under 35 U.S.C. 154(b) by 52 days.

(21) Appl. No.: 10/763,986

(22) Filed: Jan. 23, 2004

(65) Prior Publication Data

US 2004/0152795 A1 Aug. 5, 2004

Related U.S. Application Data

(60) Provisional application No. 60/442,761, filed on Jan. 27, 2003.

(51) Int. Cl.$^7$ .................................................. C08J 9/00
(52) U.S. Cl. ........................... 521/59; 521/60; 521/134; 521/139; 525/192; 525/240; 525/703
(58) Field of Search ............................ 521/59, 60, 134, 521/139; 525/192, 240, 703

(56) References Cited

U.S. PATENT DOCUMENTS

| 5,759,569 A | * | 6/1998 | Hird et al. ................... 424/443 |
| 6,316,392 B1 | * | 11/2001 | Heimann et al. ............ 508/136 |
| 6,331,509 B1 | * | 12/2001 | Heimann et al. ............ 508/136 |

* cited by examiner

*Primary Examiner*—Morton Foelak
(74) *Attorney, Agent, or Firm*—Suzanne Kikel, Patent Agent

(57) ABSTRACT

Interpolymer resin particles comprised of 20% to 80% by weight polyolefin, e.g. polyethylene and 80% to 20% by weight of an in situ polymerized vinyl aromatic resin, e.g. polystyrene or poly(styrene-butyl acrylate) and forming an interpenetrating network of polyolefin and vinyl aromatic resin particles. The interpolymer particles are impregnated with a volatile hydrocarbon blowing agent, and limonene, e.g. d-limonene, ranging from about 0.1 to about 5 parts, preferably 0.1 to 1 part by weight, based on 100 parts by weight of the interpolymer particles, for improved expandability and a pleasant fragrance.

18 Claims, No Drawings

FOAMABLE INTERPOLYMER RESIN PARTICLES CONTAINING LIMONENE AS A BLOWING AID

This application claims the benefit of U.S. Provisional Patent Application No. 60/442,761 filed on Jan. 27, 2003.

BACKGROUND OF THE INVENTION

1. Field of the Invention

The present invention relates to foamable interpolymer resin particles comprised of polyolefins, e.g. polyethylene, and polymerized vinyl aromatic resin. More particularly, the present invention relates to foamable interpolymer resin particles comprised of a volatile blowing agent ranging from between about 1.5% to about 20 wt % based on the weight of the particles and 0.1 to about 5 parts, preferably 0.1 to 1.0 part, by weight limonene, based on 100 parts by weight of the foamable interpolymer resin particles, as a plasticizer or blowing aid.

2. Background Art

It is known to polymerize a vinyl aromatic monomer, such as styrene, within polyethylene particles. U.S. Pat. No. 3,959,189, issued to Kitamori and assigned to Sekisui Kaseihin Kabushiki Kaisha, discloses a process for producing polyethylene resin particles which comprises suspending in an aqueous medium polyethylene resin particles, adding to the suspension 30 to 100% by weight based on the weight of the particles of a styrene monomer and an initiator for polymerizing the monomer, and polymerizing the monomer inside the polyethylene resin particles. The particles can then be made foamable by impregnating them with a blowing agent, preferably after the polymerization of the styrene monomer and the cross-linking of the polyethylene resin. The blowing agent generally is a volatile blowing agent, i.e. aliphatic hydrocarbons such as n-propane, n-butane, isobutane, n-pentane, iso-pentane, n-hexane and neopentane; or cycloaliphatic hydrocarbons such as cyclobutane and cyclopentane; and halogenated hydrocarbons such as methyl chloride, ethyl chloride, methylene chloride, trichlorofluoromethane, dichlorofluoromethane, dichlorodifluormethane, chlorodifluoromethane and dichlorotetrafluoroethane, etc. in an amount between 5 to 20% by weight based on the weight of the polyethylene-polystyrene resin particles.

U.S. Pat. No. 4,782,098, issued to Richard B. Allen, et al and assigned to General Electric, Co., discloses foamable interpolymer beads comprising polyphenylene ether resin and a polymerized vinyl aromatic monomer that is polymerized in the presence of a polymerization catalyst to form interpolymerized thermoplastic resin beads. A volatile blowing agent is introduced under pressure into the thermoplastic resin beads.

U.S. Pat. Nos. 4,303,756 and 4,303,757 issued to Kajimura, et al. and assigned to Sekisui Kaseihin Kogyo Kabushiki Kaisha disclose a process for producing expandable thermoplastic resin beads where a vinyl aromatic monomer is polymerized onto the backbone of the polypropylene; and introducing a blowing agent into the thermoplastic resin beads. The blowing agent is the same as that taught in the aforesaid U.S. Pat. No. 4,782,098.

U.S. Pat. No. 4,429,059 issued to Ozutsumi, et al. and assigned to Sekisui Kaseihin Kogyo Kabushiki Kaisha discloses a process for producing foamable polyolefin particles comprising adding a mixture of 3 to 15 parts by weight of a blowing agent and 0.5 to 5 parts by weight of a blowing aid to 100 parts by weight of polyolefin particles. Column 2, lines 63–66, teach that the blowing aid causes the interior of the particles to be in a plastic state to facilitate the foaming of the particles. Representative blowing aids used as a plasticizer are benzene, toluene, xylene, trichlene, perchlene, cyclohexane, carbon tetrachloride, etc.

The particles of the prior art are impregnated with a blowing agent, or in the instance of the aforesaid U.S. Pat. No. 4,429,059 with a blowing agent and a blowing aid. The blowing agents are generally "volatile" hydrocarbons, and the blowing aids are generally considered as hazardous air pollutants (HAPS), as found in the 1990 Federal Clean Air Act Amendments, Section 112. The blowing agents and blowing aids generally are emitted into the environment during the processing and foaming of the particles. Both the producer and the converter of the particles may be forced to reduce the emissions to acceptable regulatory levels, which would involve investing in complicated equipment for collecting the emitted hydrocarbons. The number of foamable particles and foamed articles produced in a given time will be dependent on the permissible regulatory levels for hydrocarbon emissions in a given geographical area. A further disadvantage with the types of blowing aids taught in the aforesaid U.S. Pat. No. 4,429,059, e.g. toluene, benzene, etc. is the associated offensive smell during processing of the foamable particles.

It would be desirable to use a blowing aid that is not considered to be a hazardous air pollutant and that does not have an offensive odor while still providing excellent foamability and molding fusability properties.

It is known to use d-limonene to improve the expandability of primarily styrene-containing expandable polymers. Examples are JP 08208877 (open for public inspection application Aug. 13, 1996) to Sekisui Plastics, Japan; JP 07309968 (granted JP 30609839 on Jul. 10, 2000) to Achilles Corp., Japan; and JP 93202250A to Asahi Chemical Industry Co., Ltd. (Hei5-202250).

The use of limonene in styrene as a plasticizer or as a tackifier is further exemplified in: U.S. Pat. No. 5,222,378; EP 0 701 589 B1 (The Dow Chemical Co.) which is also WO 94/19383 (PCT/US94/06112); and U.S. Pat. No. 4,959,412 (Arizona Chemical Company).

JP 11080412 (Achilles Corporation) (Entitled: "Heat-resistant cellular styrene polymer-polyoxyphenylene") teaches the use of limonene in a blend of styrenic resin and a polyphenylene ether-based resin. The abstract teaches that the particles contain 3–15 parts volatile blowing agent-impregnated polymer particles consisting of 50–90 parts styrene polymers and 10–50 parts poly(phenylene ethers) and 0.1–5 parts (for 100 parts polymer particles) limonene. A composition containing polystyrene, poly(phenylene ether), ethylenebis(stearamide), pentane, and limonene was extruded, pelletized, and molded to give a test piece showing good heat resistance with short molding cycle time. It is stated that the addition of limonene in the base resin can improve the foaming ability of the base resin, and the molding time and cooling time can be shortened.

The prior art does not provide for interpolymer particles comprising a polyolefin, e.g. polyethylene and an in situ polymerized vinyl aromatic resin forming an interpenetrating network of polyolefin and vinyl aromatic resin particles, and which particles contain a blowing aid that is not considered to be a hazardous air pollutant; that is considered as having a pleasant smell; and that is more effective as a blowing aid or plasticizer than those of the prior art.

SUMMARY OF THE INVENTION

The invention overcomes the above-described disadvantages of the prior art.

The present invention provides foamable interpolymer resin particles comprised from about 20% to about 80% by weight of a polyolefin and from about 80% to about 20% by weight of a polymerized vinyl aromatic resin which form an interpenetrating network of polyolefin and vinyl aromatic resin particles. The foamable interpolymer resin particles are impregnated with a volatile hydrocarbon blowing agent and limonene as a blowing aid or plasticizer. Limonene is not considered to be a hazardous air pollutant; has a pleasant citrus smell; and improves the expandability of the interpolymer particles.

The foamable interpolymer particles can be produced by suspending in an aqueous medium polyolefin particles; preferably adding a cross-linking agent to the polyolefin particles and from about 25% to about 400%, preferably 80% to 400%, by weight of vinyl aromatic monomer or monomer mixtures based on the weight of the polyolefin particles; adding a polymerization initiator to polymerize the vinyl aromatic monomer or monomer mixtures within the polyolefin particles to form an interpenetrating network of polyolefin and vinyl aromatic resin particles. The interpolymer particles are impregnated with a volatile, hydrocarbon blowing agent in an amount ranging from about 1.5% to about 20% by weight, preferably 1.5% to 15 % by weight, and more preferably, 5% to 15% by weight, based on the weight of the interpolymer particles, and limonene in an amount ranging from about 0.1 to about 5 parts, preferably 0.1 to about 1.0 part based on 100 parts by weight of interpolymer particles.

According to a further aspect of the invention, there is provided foamable interpolymer resin particles comprised of: about 20% to about 80% by weight polyolefin, preferably, cross-linked, and from about 80% to about 20% by weight of a polymerized vinyl aromatic resin, which form an interpenetrating network of polyolefin and vinyl aromatic resin particles; a blowing agent ranging from about 1.5% to about 20% by weight, preferably 1.5% to 15% by weight, and more preferably 5% to 15% by weight, based on the weight of the foamable interpolymer particles; and from about 0.1 to about 5 parts, preferably 0.1 to about 1 part (for 100 parts interpolymer particles) of limonene, as a plasticizer or blowing aid.

The use of limonene in the invention allows the blowing agent level to be reduced in the processing of the interpolymer particles and therefore the blowing agent level in the particles per se is reduced. This is particularly important when a volatile hydrocarbon blowing agent, e.g. pentane is used as a blowing agent in view of the environmental issues, e.g. emissions of the blowing agent, discussed hereinabove in the prior art section.

In a preferred embodiment, the polymerized vinyl aromatic resin is vinyl aromatic homopolymers, preferably, polystyrene, or polymerized vinyl aromatic copolymers, preferably, poly)styrene-butyl acrylate), and the polyolefin is polyethylene.

It is, therefore, an object of the present invention to provide foamable interpolymer resin particles comprising a blowing agent and limonene as a blowing aid or plasticizer which combination results in improved expandability of the resin particles in order to form articles with at least improved physical properties compared to that of the prior art.

It is a further object of the present invention to eliminate the offensive odor generally associated with particles that contain hazardous air pollutants, such as toluene, benzene, etc. as a blowing aid in the impregnation of the blowing agent in the particles.

These and other objects of the present invention will be better appreciated and understood by those skilled in the art from the following description and appended claims.

DETAILED DESCRIPTION OF THE INVENTION

The interpolymer particles of the invention are comprised of polyolefin and in situ polymerized vinyl aromatic resin that form an interpenetrating network of polyolefin and vinyl aromatic resin particles. The interpolymer particles are impregnated with a blowing agent and limonene as a plasticizer or blowing aid.

Such interpolymer particles can be obtained by processes described in the aforesaid U.S. Pat. No. 3,959,189 and in U.S. Pat. No. 4,168,353 (Kitamori), both assigned to Sekisui Kaseihin Kogyo Kabushiki Kaisha. The process comprises suspending polyolefin particles and vinyl aromatic monomer or monomer mixtures in an aqueous suspension and polymerizing the monomer or monomer mixtures inside the polyolefin particles. The teachings of U.S. Pat. Nos. 3,959,189 and 4,168,353 are incorporated herein in their entirety by reference, except for the use of solvent in the impregnation step, examples of which include toluene, benzene, 1,2-dichloropropane, etc. The present invention particularly sets out to eliminate the use of HAPS chemicals, such as toluene and benzene, as a solvent or as a blowing aid.

The term "polyolefin" as used herein is a plastic, which is prepared from at least one olefinic monomer, such as ethylene, propylene, butene, hexane or octane. In a preferred embodiment, the polyolefin is polyethylene.

The term "polyethylene" as used herein includes not only a homopolymer of ethylene, but also an ethylene copolymer composed of at least 50 mole %, preferably at least 70 mole %, of an ethylene unit and a minor proportion of a monomer copolymerizable with ethylene, and a blend of at least 50% by weight, preferably at least 60% by weight, of the ethylene homopolymer or copolymer with another polymer.

Examples of monomers copolymerizable with ethylene are vinyl acetate, vinyl chloride, propylene, butene, hexene, acrylic acid and its esters, methacrylic acid and its esters. The other polymer that can be blended with the ethylene homopolymer or copolymer may be any polymer compatible with it. Examples are polypropylene, polybutadiene, polyisoprene, polychloroprene, chlorinated polyethylene, polyvinyl chloride, a styrene/butadiene copolymer, a vinyl acetate/ethylene copolymer, an acrylonitrile/butadiene copolymer, a vinyl chloride/vinyl acetate copolymer, etc.

Examples of polyethylene resin that can be advantageously employed in the present invention are low-, medium-, and high-density polyethylene, an ethylene vinyl acetate copolymer, an ethylene/propylene copolymer, a blend of polyethylene and polypropylene, a blend of polyethylene and an ethylene/vinyl acetate copolymer, and a blend of polyethylene and an ethylene/propylene copolymer. Ethylene-butyl acrylate copolymer and ethylene-methyl methacrylate copolymer can also be used.

The amount of polyolefin in the interpolymer resin particles of the invention ranges from about 20% to about 80%, preferably 20% to 55%, by weight based on the weight of the interpolymer resin particles.

The amount of polymerized vinyl aromatic resin in the interpolymer resin particles of the invention ranges from about 20% to about 80%, preferably from about 45% to about 80%, by weight based on the weight of the interpolymer resin particles.

The vinyl aromatic resin can be polymerized monomers or the resin can be vinyl aromatic copolymers. Examples of vinyl aromatic monomers are styrene, alpha-methylstyrene, ethylstyrene, chlorostyrene, bromostyrene, vinyltoluene, vinylbenzene, and isopropylxylene. These monomers may be used either alone or in admixture.

The vinyl aromatic copolymers can be similar to those disclosed in U.S. Pat. No. 4,049,594 (Ideka) assigned to Sekisui Kaseihin Kogyo Kabushiki Kaisha. These copolymers are styrene copolymers prepared by the copolymerization of a styrene monomer with monomers such as 1,3-butadiene, alkyl acrylates (for example, butyl acrylate, ethyl acrylate and 2-ethylhexyl acrylate), alkyl methacrylates (for example, methyl methacrylate, ethyl methacrylate, butyl methacrylate and 2-ethylhexyl methacrylate) acrylonitrile, vinyl acetate, alpha-methylethylene, divinyl benzene, dimethyl maleate and diethyl maleate.

Preferably, the vinyl aromatic resin is polystyrene or styrene-butyl acrylate copolymers.

In general, the interpolymer resin particles are formed as follows: The polyolefin particles are dispersed in an aqueous medium prepared by adding 0.01 to 5%, preferably 2 to 3%, by weight based on the weight of the water of a suspending agent such as water soluble high molecular weight materials, e.g., polyvinyl alcohol or methyl cellulose or slightly water soluble inorganic materials, e.g., calcium phosphate or magnesium pyrophosphate and soap, such as sodium dodecyl benzene sulfonate, and the vinyl aromatic monomers are added to the suspension and polymerized inside the polyolefin particles.

Basically any of the conventionally known and commonly used suspending agents for polymerization of the vinyl aromatic monomers can be employed. These agents are well known in the art and can be freely selected by one skilled in the art. Initially, the water is in an amount generally from 0.7 to 5, preferably 3 to 5 times that of the starting polyolefin particles employed in the aqueous suspension, on a weight basis, and gradually the ratio of the polymer particles to the water may reach around 1:1.

The polymerization of the vinyl aromatic monomers, which is absorbed in the polyolefin particles, is carried out using initiators.

The initiators suitable for suspension polymerization of the vinyl aromatic monomers are generally used in an amount of about 0.05 to 2 percent by weight, preferably 0.1 to 1 percent by weight, based on the weight of the vinyl aromatic monomer. Examples of suitable initiators include organic peroxides such as benzoyl peroxide, lauroyl peroxide, t-butyl perbenzoate and t-butyl perpivalate and azo compounds such as azobisisobutylonitrile and azobis-dimethylvaleronitrile.

These initiators can be used alone or two or more initiators can be used in combination. It is preferred that the initiators be dissolved in the vinyl aromatic monomers, which are to be absorbed in the polyolefin particles. This differs from that of the aforesaid U.S. Pat. Nos. 3,959,189 and 4,168,353, which dissolve the initiator in a solvent, e.g. toluene, benzene, and 1,2-dichloropropane. The invention sets out to eliminate the use of these solvents.

When the in situ polymerization of the vinyl aromatic monomers is completed, the polymerized vinyl aromatic resin is uniformly dispersed inside the polyolefin particles.

It is preferred to cross-link the polyolefin particles. Preferably, this cross-linking is done simultaneously with the polymerization of the vinyl aromatic monomer in the polyolefin particles, and before impregnation of the blowing agent and the limonene. For this purpose, cross-linking agents are used. Such cross-linking agents include di-t-butyl-peroxide, t-butyl-cumylperoxide, dicumyl-peroxide, α, α-bis-(t-butylperoxy)-p-diisopropylbenzene, 2,5-dimethyl-2,5-di-(t-butylperoxy)-hexyne-3,2,5-dimethyl-2,5-di-(benzoylperoxy)-hexane and t-butyl-peroxyisopropyl-carbonate. These cross-linking agents are absorbed in the polyolefin particles together with the vinyl aromatic monomers by dissolving the cross-linking agent in an amount of about 0.1 to 2 weight %, preferably 0.5 to 1 weight %, based on the weight of the polyolefin particles suspended in water. Further details of the cross-linking agents and the manner for absorbing the cross-linking agents into the polyolefin particles are given in the aforesaid U.S. Pat. No. 3,959,189.

The resulting interpolymer can be used as raw materials in producing foamed articles. The blowing agent and the limonene are introduced into the interpolymer resin particles to form foamable or expandable interpolymer particles, which in turn, are used to mold foamed articles.

The blowing agent should have a boiling point lower than the softening point of the polyolefin and should be gaseous or liquid at room temperature (about 20 to 30° C.) and normal pressure (about atmospheric). Blowing agents are well known in the art and generally have boiling points ranging from −42° C. to 80° C., more generally, from −10° C. to 36° C. Suitable hydrocarbon blowing agents include aliphatic hydrocarbons such as n-propane, n-butane, iso-butane, n-pentane, iso-pentane, n-hexane, and neopentane, cycloaliphatic hydrocarbons such as cyclobutane and cyclopentane, and halogenated hydrocarbons such as methyl chloride, ethyl chloride, methylene chloride, trichlorofluoromethane, dischlorofluoromethane, dichlorodifluormethane, chlorodifluoromethane and dichloroetetrafluoroethane, etc. These blowing agents can be used alone or as mixtures. If n-butane, ethyl chloride, and dichlorotetrafluoroethane, which are gaseous at room temperature and normal pressure, are used as a mixture, it is possible to achieve foaming to a low bulk density. The specific types of volatile blowing agents are taught in the aforesaid U.S. Pat. No. 3,959,180. Generally, the blowing agent is selected from the group consisting of n-pentane, iso-pentane, neopentane, cylcopentane, and mixtures thereof.

The amount of the blowing agent ranges from about 1.5% to about 20% by weight, preferably about 1.5% to 15% by weight, more preferably from 5% to 15% by weight, based on the weight of the interpolymer particles.

Limonene is used in combination with the blowing agent and as stated herein above, acts as a plasticizer or blowing aid in the invention. Limonene is a mono-terpene hydrocarbon existing widely in the plant world. The known types are d-limonene, l-limonene, and dl-limonene. D-limonene is contained in the skin of citrus fruits and is used in food additives as a fragrant agent; its boiling point is about 176° C.; and its flammability is low. D-limonene is a colorless liquid, has a pleasant orange-like aroma, is approved as a food additive, and is widely used as a raw material of perfume. As stated hereinabove, limonene is not a hazardous air pollutant.

Limonene is used in the invention to replace benzene, toluene, etc., as blowing aids disclosed in the aforesaid U.S. Pat. No. 4,429,059. The amount of limonene ranges from about 0.1 to 5 parts, preferably 0.1 to about 1 part, by weight per 100 parts by weight of the foamable interpolymer resin particles.

The interpolymer particles of the invention may be conveniently produced as follows: In a first reactor, the polyolefin particles are suspended in an aqueous medium containing a dispersing agent. The dispersing agent may be polyvinyl alcohol, methylcellulose, calcium phosphate, magnesium pyrophosphate, calcium carbonate, tricalcium phosphate, etc. The amount of dispersing agent employed is 0.01 to 5% by weight based on the amount of water. A surfactant may be added to the aqueous medium. Generally, the surfactant is used to lower the surface tension of the suspension and helps to emulsify the water/vinyl aromatic monomer in mixture in the initiator and wax mixes, if used. A suitable wax would be ethylene bistearamide. The aqueous medium is generally heated to a temperature at which the vinyl aromatic monomers can be polymerized, i.e. from about 60° C. to about 120° C. over a period of time, for example, 12 to 20 hours. Over this 12 to 20 hour period, the vinyl aromatic monomers, the vinyl aromatic polymerization initiator, and the cross-linking agent are added to the resulting suspension containing the polyolefin particles, which are dispersed in the aqueous medium. These materials may be added all at one time, or gradually in individual portions.

The interpolymer particles are acidified, dewatered, screened, and subsequently charged to a second reactor where the particles are impregnated with the blowing agent and the limonene.

The impregnation step is carried out by suspending the interpolymer particles in an aqueous medium, adding the blowing agent and limonene to the resulting suspension, and stirring at a temperature of, preferably, about 40° C. degrees to 80° C. The blowing agent and the limonene can be blended together and then added to the interpolymer particles or can be added to the interpolymer particles separately.

Alternatively, the blowing agent and the limonene can be added to the first reactor during or after the polymerization process.

The above processes describe a wet process for impregnation of the interpolymer particles. Alternatively, the interpolymer particles can be impregnated via an anhydrous process similar to that taught in Column 4, lines 20–36 of the aforesaid U.S. Pat. No. 4,429,059, which teachings in their entirety are incorporated herein by reference.

The interpolymer resin particles may also contain an anti-static additive; a flame retardant; a colorant or dye; and a filler material; other additives such as chain transfer agents, suitable examples including $C_{2-15}$ alkyl mercaptans, such as n-dodecyl mercaptan, t-dodecyl mercaptan, t-butyl mercaptan and n-butyl mercaptan, and other agents such as pentaphenyl ethane and the dimer of α-methyl styrene; and nucleating agents, such as polyolefin waxes, i.e. polyethylene waxes.

The following example is intended to assist in understanding the present invention, however, in no way, should these examples be interpreted as limiting the scope thereof.

EXAMPLE 85 pounds of interpolymer particles comprised of 30% by weight polyethylene and 70% by weight of an in situ polymerized styrene-butyl acrylate copolymer inside the polyethylene particles were charged into a 25-gallon reactor for impregnation. This reactor contained 93 pounds of deionized water, and 5 grams of Calsoft F90 (sodium dodecyl benzene sulfonate), a surfactant. The interpolymer particles were produced according to the process taught in the aforesaid U.S. Pat. No. 3,959,189. 0.35% by weight d-limonene, which is Technical Grade (95% purity) from Florida Chemical Company, and 13% by weight isopentane were added separately to the reactor. The contents of the reactor were stirred at 200 rpm and heated to 50° C. for about 4 hours.

The expandability of the resultant foamed particles was measured by the minimum bulk density, which is achieved as the particles are processed in a single pass through a TRI 502 continuous steam expander. The resulting particles had a more pleasant smell, i.e. an orange blossom fragrance, compared to the interpolymer particles of the prior art.

The foamed particles produced in the Example were dried out and then molded into 24 inch×24 inch×2 inch rectangular samples. The machine was a Kohler General KG 606 steam molding press. The physical properties were measured and/or tested according to the standards set up by ASTM D3575. These properties appear in the Table below. In the Table, the interpolymer particles of the invention containing d-limonene are compared to the interpolymer particle of the prior art, where ethylbenzene was used as the blowing aid.

TABLE

Expandability Summary
(Type of Blowing Agent and Amount were the Same for Both)

| Blowing Aid | Amount, pph (parts by weight per hundred parts by weight polymer) | Minimum Achievable Density, pcf |
|---|---|---|
| Ethylbenzene | 0.50 | 1.20 |
| d-Limonene | 0.35 | 1.15 |

Foam Physical Properties
(At 1.25 pcf Foam Density)

| | Blowing Aid | | |
|---|---|---|---|
| | Ethylbenzene | d-Limonene | |
| Property | (EB) Value | Value | % of EB Standard |
| Compressive Strength @ 10% Deformation, psi | 12.0 | 14.2 | 118 |
| Compressive Strength @ 25% Deformation, psi | 15.5 | 17.6 | 114 |
| Flexural Strength @ 5% Strain, psi | 26.9 | 26.9 | 100 |
| Tear Strength, lbs/in | 6.6 | 7.4 | 112 |

Cushioning Performance
Average of 2–5 Impacts, 1.25 pcf Foam Density, Values are Deceleration in G's (lower = better)

| | 1.0 psi Static Stress | | 2.0 psi Static Stress | |
|---|---|---|---|---|
| Blowing Aid | 18-inch Drop | 30-inch Drop | 18-inch Drop | 30-inch Drop |
| Ethylbenzene | 33.4 | 58.7 | 45.0 | 113.8 |
| d-Limonene | 33.0 | 55.0 | 40.8 | 104.4 |

As can be seen from the Table, the interpolymer particles of the invention can use a lower amount of blowing aid, i.e. 0.35 pph (invention) vs. 0.50 pph (for the particles using ethylbenzene as the blowing aid), and can obtain a lower minimum achievable density compared to the particles of the prior art; that is, 1.15 pounds per cubic foot (pcf) for the interpolymer particles of the invention vs. 1.20 pounds per cubic foot (pcf) for the particles of the prior art using ethylbenzene. Also, the values for the properties of the interpolymer particles of the invention using d-limonene show an improvement compared to those for conventional interpolymer particles using ethylbenzene as the blowing aid.

While the present invention has been particularly set forth in terms of specific embodiments thereof, it will be understood that numerous variations for the invention are now enabled and reside within the scope of the invention. Accordingly, the invention is to be broadly construed and limited only by the scope and spirit of the claims now appended hereto. Also, even though, the terms "vinyl aromatic monomer" and "vinyl aromatic monomers" were used with reference to the interpolymer resin particles of the invention and the process for producing these particles of the invention, it is to be understood that these terms can be interchangeable with "vinyl aromatic copolymer" and "vinyl aromatic copolymers", respectively.

What is claimed is:

1. Foamable interpolymer resin particles comprising:
   about 20% to about 80% by weight polyolefin and from about 80% to about 20% by weight of a polymerized vinyl aromatic resin forming an interpenetrating network of polyolefin and vinyl aromatic resin particles;
   from about 1.5% by weight to about 20% by weight of a blowing agent and from about 0.1 to about 5 parts by weight limonene based on 100 parts by weight of said interpolymer particles, impregnated in said interpolymer resin particles.

2. Foamable interpolymer resin particles of claim 1 wherein said weight of said polymerized vinyl aromatic resin ranges from about 45% to about 80% by weight and wherein said weight of said polyolefin ranges from about 20% to about 55% by weight based on the weight of said interpolymer particles.

3. Foamable interpolymer resin particles of claim 1 wherein said vinyl aromatic resin is selected from the group consisting of vinyl aromatic homopolymer and vinyl aromatic copolymer, which is polymerized in said polyolefin particles.

4. Foamable interpolymer resin particles of claim 3 wherein said vinyl aromatic resin consists of vinyl aromatic copolymer.

5. Foamable interpolymer resin particles of claim 3 wherein said vinyl aromatic copolymer is a copolymer of styrene and butyl acrylate.

6. Foamable interpolymer resin particles of claim 3 wherein said vinyl aromatic resin consists of vinyl aromatic homopolymer.

7. Foamable interpolymer resin particles of claim 6 wherein said vinyl aromatic homopolymer is styrene.

8. Foamable interpolymer resin particles of claim 1 wherein said blowing agent is selected from the group consisting of n-propane, n-butane, iso-butane, n-pentane, iso-pentane, n-hexane, neopentane, cyclobutane, cyclopentane, methyl chloride, ethyl chloride, methylene chloride, trichlorofluoromethane, dischlorofluoromethane, dichlorodifluormethane, chlorodifluoromethane and dichloroetetrafluoroethane, and mixtures thereof.

9. Foamable interpolymer resin particles of claim 8 wherein said blowing agent is selected from the group consisting of n-pentane, iso-pentane, neopentane, cyclopentane, and mixtures thereof.

10. Foamable interpolymer resin particles of claim 1 wherein said polyolefin is polyethylene.

11. Foamable interpolymer resin particles of claim 1 wherein said limonene is selected from the group consisting of d-limonene, l-limonene, and dl-limonene.

12. Foamable interpolymer resin particles of claim 11 wherein said limonene is d-limonene.

13. Foamable interpolymer resin particles of claim 1 wherein said limonene ranges from about 0.1 to 1 parts by weight based on 100 parts by weight of said interpolymer particles.

14. A foamed article with at least improved physical properties produced from the foamable interpolymer resin particles of claim 1.

15. A process for forming the foamable interpolymer resin particles of claim 1 comprising the steps of blending said blowing agent and said limonene together to form a mixture and adding said mixture to said interpolymer resin particles in the impregnation step of said interpolymer resin particles.

16. A process for forming the foamable interpolymer resin particles of claim 1 comprising the steps of adding said blowing agent and said limonene separately to the interpolymer resin particles in the impregnation step of said interpolymer resin particles.

17. A process of claim 15 wherein said polyolefin is polyethylene and said vinyl aromatic resin is styrene.

18. A process of claim 16 wherein said polyolefin is polyethylene and said vinyl aromatic resin is styrene.

* * * * *